Figure 1:
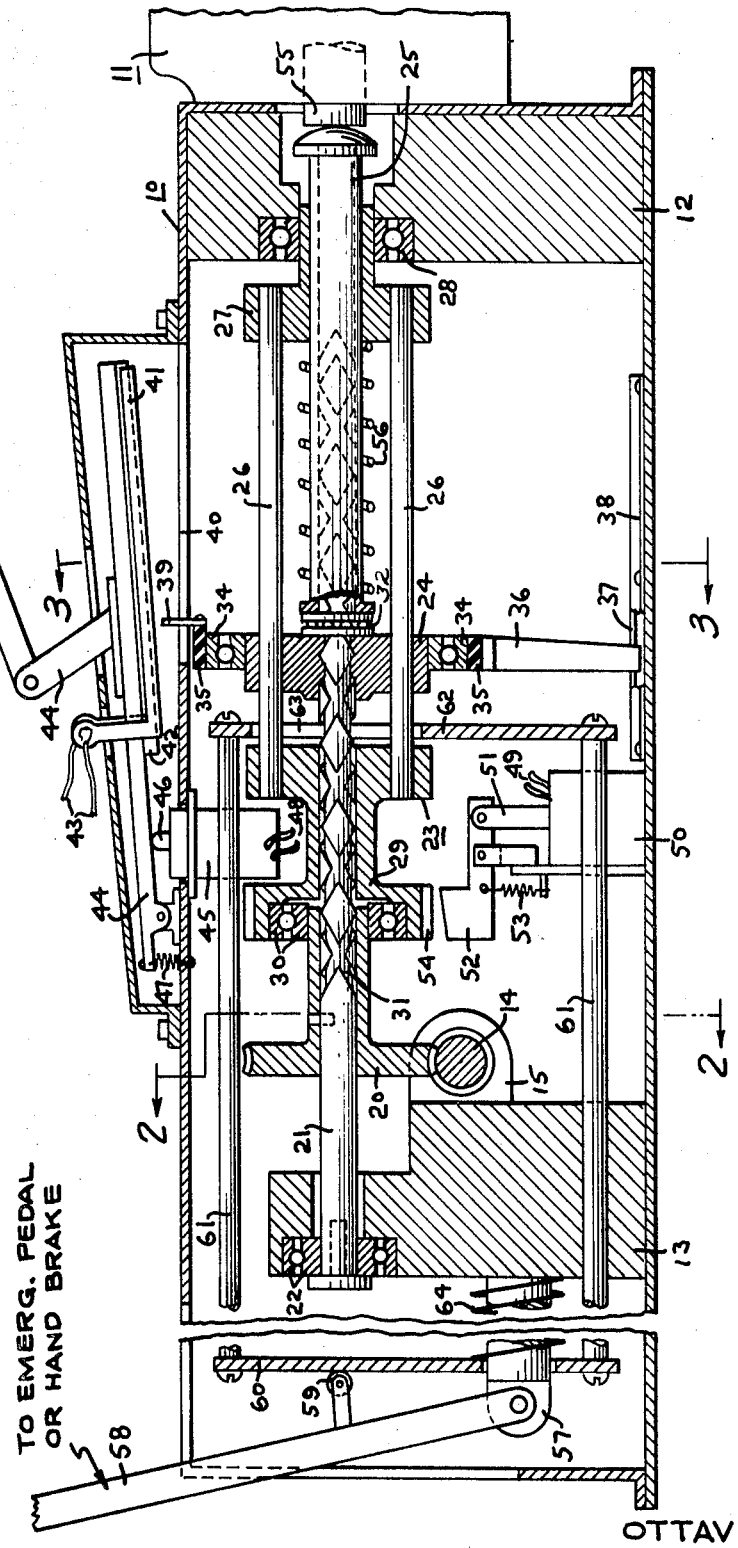

United States Patent

[11] 3,604,540

| [72] | Inventor | Ottavio Falcone |
| | | 2421 S. 15th St., Philadelphia, Pa. 19145 |
| [21] | Appl. No. | 835,436 |
| [22] | Filed | June 23, 1969 |
| [45] | Patented | Sept. 14, 1971 |

[54] BRAKE ACTUATOR
8 Claims, 3 Drawing Figs.

[52] U.S. Cl. .................................................. 188/106 R,
188/156, 188/162
[51] Int. Cl. ...................................................... F16d 65/34
[50] Field of Search ........................................ 188/106 R,
156, 157, 162

[56] References Cited
UNITED STATES PATENTS

| 566,939 | 9/1896 | Roney | 188/162 |
| 1,524,426 | 1/1925 | Farmer | 188/162 X |
| 1,937,862 | 12/1933 | Adams | 188/162 |
| 1,998,918 | 4/1935 | Apple et al. | 188/162 X |
| 3,013,624 | 12/1961 | Remer et al. | 188/162 X |

*Primary Examiner*—George E. A. Halvosa
*Attorney*—Edelsona and Udell

ABSTRACT: A brake actuator mechanism including an axiaLly shiftable plunger engaged with the piston of the master cylinder of a hydraulically operated automotive brake system to provide a power braking system. Axial movement of the plunger is accomplished by a shaft internally rotatable within the plunger in screw-threaded relationship with a follower nut carried thereon which moves the plunger. Rotation of the shaft in brake-applying direction is caused by electrical energization of an electric motor coupled to the shaft through a worm gear and pinion drive. Operation of the motor results from depression of the vehicle brake pedal which energizes the motor through a movable switch contact, the switch contact being physically shifted with the follower nut as the latter moves the plunger axially for engaging the master cylinder piston. A solenoid is also provided to lock the follower nut against rotation while it is being driven axially for engaging the brake. The solenoid lock is released when the brake pedal is undepressed, and a spring mechanism returns the follower nut and plunger to their retracted positions.

INVENTOR.
OTTAVIO FALCONE

BRAKE ACTUATOR

This invention relates generally to brake actuators, and more particularly relates to an electrically operated brake actuator which may be substituted directly for the usual mechanical linkage interposed between the foot brake pedal and the hydraulic master cylinder which controls actuation of the brakes of a vehicle.

Conventional power brake systems as used in automotive vehicles today operate from a vacuum boost system which is driven by the engine of the automotive vehicle. Consequently in the event that the engine ceases to operate for any reason whatever, a not uncommon condition, the power boost for the brake system becomes completely inoperative. Unfortunately, in today's automotive vehicles, a power brake system which is deprived of its power boost requires an excessively high brake pedal force to achieve any kind of braking effect and can create a hazardous condition in any emergency situation. The power brake system according to the present invention is not dependent upon the operation of the automotive powerplant and remains fully operative even should the engine ceases to operate. Accordingly, it is a primary object of my invention to provide a novel power brake actuator which is independent of the state of operation of the internal combustion engine used as the motive drive plant for the vehicle.

Another object of my invention is to provide a novel brake actuator as aforesaid wherein the brake actuator is electrically operated and requires only sufficient foot pressure to cause the contacts of a switch to be closed.

A further object of my invention is to provide a novel brake actuator as aforesaid which may be installed in existing vehicles by disconnecting the normal drive linkage between the brake pedal and the master cylinder piston and mounting the brake actuator according to the invention in the engine compartment immediately adjacent to and operatively engaged with the master cylinder of the brake system.

Figure 2:
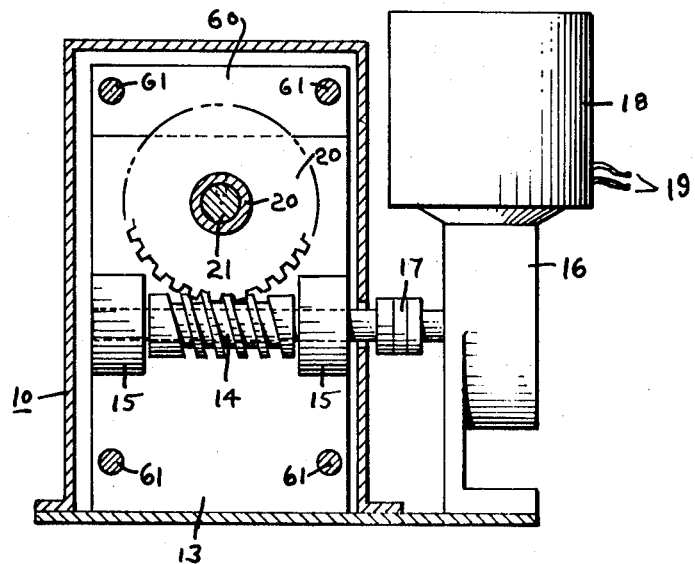
Figure 3:
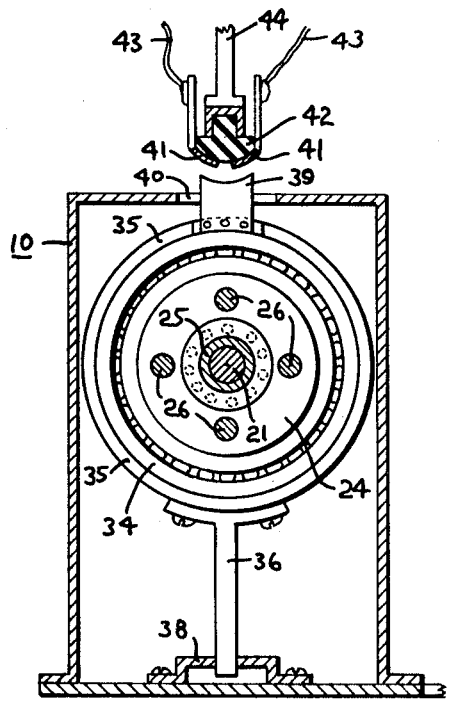

The foregoing and other objects of the invention will become clear from a reading of the following specification in conjunction with an examination of the appended drawings:

FIG. 1 is a vertical longitudinal sectional view through the brake actuator according to the invention illustrating the operating mechanism thereof in engagement with the piston of the master cylinder of a hydraulic brake system;

FIG. 2 is a vertical cross-sectional view through the brake actuator according to the invention as would be seen when viewed along the line 2—2 of FIG. 1; and FIG. 3 is another vertical cross-sectional view through the brake actuator according to the invention taken at a different axial location and as would be seen when viewed along the line 3—3 of FIG. 1. In the several figures, like elements are denoted by like reference characters.

Turning now to the drawings there is seen a brake actuator housing 10 in abutment with the master cylinder 11 of the vehicle brake system. Within the housing are a front support block 12 and a rear support block 13. Disposed in front of the rear support block 13 and carried in horizontal position is a worm gear 14 journaled at opposite ends in a pair of bearing ears 15 carried by the support block 13. As best seen from FIG. 2, the worm gear shaft extends through the housing 10 into a speed-reducing mechanism 16 through a coupling 17, the speed reducer 16 being driven by an electrically energizable motor 18 when the latter is energized via conductors 19.

Worm gear 14 is drivingly engaged with a pinion 20 which is secured to for rotationally driving a shaft 21. The shaft 21 is journaled for rotation at its rear end in a bearing 22 carried by the rear support block 13 and extends longitudinally forward through the housing 10 through a rod guide mechanism designated as 23, a follower nut mechanism 24 and a pressure plunger 25. The rod guide mechanism 23 includes four longitudinally extending guide rods 26 fixedly secured at their forward ends to a block 27 rotatably journaled in bearing 28 carried by front support block 12, while being fixedly secured at their rear ends to a pinion gear 29. The pinion gear 29 carries a bearing 30 at its rear end within which is journaled for rotation the front end of pinion gear 20, shaft 21 passing freely longitudinally through the pinion gear 29.

Shaft 21 is threaded as at 31 for most of its length from the pinion gear 20 forward to its forward end which latter terminates within pressure plunger 25 proximate to the forward end of the plunger. The plunger 25 is not internally threaded and it is free to rotate on shaft 21 while being also free to slide longitudinally axially through the rotatable block 27 of the rod guide mechanism 23. Threadedly engaged upon the threaded portion 31 of shaft 21 is the follower nut 24 through which also passes the guide rods 26. Disposed about the shaft 21 between the front face of follower nut 24 and the rear end of pressure plunger 25 is a thrust bearing 32 which permits the plunger 25 to rotate axially with respect to the follower nut 24 during the operation of the brake actuator.

The follower nut 24 is itself journaled for rotation within a bearing having an outer race 34 upon which is fixed an annular insulating ring 35. Secured to the bottom of the ring 35 is an antirotation T-shaped member 36 which has its lower end disposed within the longitudinally extending slot 37 of a slot guide 38 which is fixedly secured to the housing 10. The slot 37 extends longitudinally of the housing to permit the follower nut 24 to move axially along the shaft 21 without rotation of the outer race 34 occurring.

Fixedly secured to the upper end of the insulating ring 35 is an electrically conductive contact 39 which extends upward through a longitudinally extending slot 40 in the housing 10. The contact 39 is spaced below and normally out of engagement with a pair of conductive strips 41 which are physically carried by an insulating bar 42 in noncontacting spaced apart relationship as best seen in the showing of FIG. 3. Each of the conductive strips 41 is connected to one of a pair of electrical conductors 43, and the electrical conductors 43 are connected in an electrical circuit with a source of electrical energy, such as the automobile battery, and the electrical conductors 19 of the motor 18. Insulating bar 42 which carries the conductive strips 41 is secured to a spring-loaded pivoted actuator arm 44 which is connected through a linkage to the normal brake pedal of the automotive vehicle.

Secured to the housing 10 beneath the actuator arm 44 is an electrical switch 45 having an actuator button 46 in engagement with the actuator arm 44. The counterbalancing force provided by biasing spring 47 in the absence of applied brake pedal force is sufficient to maintain the actuator arm 44 in an elevated position such that switch 45 is open and conductive strips 41 are spaced upward out of engagement with contact 39. Extending from switch 45 are a pair of electrical conductors 48 which are connected in an electric circuit with a source of electrical energy such as the automotive vehicle battery and with electrical conductors 49 of solenoid 50, which latter is secured internally to the housing 10.

The plunger 51 of solenoid 50 is pivotally connected to one end of a locking arm 52 which is biased, as by means of the spring 53, out of engagement with the teeth 54 of pinion gear 29. When the solenoid 50 is energized to retract the plunger 51, locking arm 52 is pivoted into engagement between the proximate teeth 54 of pinion gear 29 to thereby lock the entire rod guide mechanism 23 and prevent it from rotating. This condition occurs as soon as the brake pedal is depressed to cause actuator button 46 of switch 45 to close the switch and energize the solenoid 50. It will be observed that this occurs prior to engagement of conductive strips 41 with contact 39. The reason for this arrangement will become clear hereinafter.

As shown in FIG. 1, the brake actuator is in a deenergized state and the brake mechanism has not been applied. When it is now desired to apply the brake, the brake pedal is depressed to actuate solenoid 50 and lock the rod guide mechanism as already described, with continued depression of the brake pedal causing the conductive strips 41 to engage contact 39 and thereby energize electric motor 18 and drive worm gear 14. Rotation of the worm gear 14 causes pinion gear 20 to rotate and therefore rotates shaft 21. With the rod guide mechanism 23 locked against rotation by solenoid 50, the guide rods 26 prevent rotation of the follower nut 24 and thereby cause the follower nut 24 to be axially advanced to the right by the rotation of shaft 21.

As the follower nut 24 shifts axially to the right it drives pressure plunger 25 through the block 27 against the piston 55 of the master cylinder 11 to thereby apply the brakes to the vehicle. The plunger 25 moves to the right to apply more and more braking pressure until the contact 39 carried by the follower nut 24 disengages from the conductive strips 41 to thereby deenergize the electrical motor 18 and interrupt rotation of the worm gear 14. Thus, lightly applied pressure to the brake pedal will only depress the conductive strips 41 a small distance and will permit the contact 39 to disengage there from when the follower nut 24 has moved only a short distance to the right so that only a small amount of braking pressure is applied to the vehicle. However, if the brake pedal is continuously depressed, the contact 39 will not disengage from the conductive strips 41 until the end of travel of the follower nut 24 is reached, at which point maximum braking effort will have been applied.

Regardless of the fact that the drive motor 18 has ultimately stopped and the braking pressure is not being increased, there is no decrease of braking pressure so long as the brake pedal remains depressed sufficiently to merely close the switch 45 and thereby maintain the rod guide mechanism 23 in its rotatably locked condition due to energization of solenoid 50. When however the brake pedal is released, switch 45 opens and deenergizes solenoid 50, and locking arm 52 is disengaged by spring 53 from the teeth 54 of pinion gear 29. Compression spring 56 disposed about plunger 25 is in a compressed state due to the axial shift of the plunder 25 to the right through block 27. The energy stored in the spring 56 driving backwards through the thrust bearing 32 against follower nut 24 now causes the follower nut 24 to rotate axially back along the shaft 21 and rotate the entire rod guide mechanism 23 within the front and rear bearings 28 and 30. The rod guide mechanism 23 rotates of course without axial shift while the follower nut 24 in addition to rotating within its bearing race 34 shifts axially to the left along shaft 21 and guide rods 26 of the rod guide mechanism 23. The contact 39 and outer race 34 do not of course rotate but merely shift axially due to the guiding action of the T member 36 riding within the slot guide 38.

As a safety precaution, in the event of electrical power failure, a manually operable mechanical drive mechanism is incorporated into the actuator so that braking action may always be obtained. The manual mechanism is best seen in the showing of FIG. 1, some details being also visible in the showing of FIG. 2. Extending rearward from rear support block 13 is a stud 57 to which is pivoted the lower end of a drive lever 58 which latter is actuated by forward movement thereof through a linkage connected to the emergency brake pedal or the hand brake handle.

Extending forward from the drive lever 58 at an intermediate point is a bearing roller 59 which engages against the rear surface of plate 60. Fixedly secured to and extending forward from plate 60 are four drive rods 61 which are fixedly secured at their forward ends to drive plate 62 which latter is apertured as at 63 to permit the passage therethrough of shaft 21 and guide rods 26. The two lower drive rods 61 are projected slidably through the rear support block 13 which latter acts as a support structure for the drive frame which is composed of the rear and front plates 60 and 62 together with the drive rods 61.

When the drive lever 58 is moved forward, bearing roller 59 drives plate 60, and hence drive plate 62, forward against the bias of compression spring 64 disposed about stud 57 to cause the front edge of the drive plate 62 to engage the rear surface of the follower nut 24 and thereby drive forward the follower nut 24 and plunger 25 to actuate the master cylinder 11 and apply the brakes to the vehicle. Release of forward drive pressure on the drive lever 58 permits the compression spring 64 to retract the drive frame and thereby disengage the drive plate 62 from the follower nut 24 to permit release of the brake mechanism.

Having now described my invention in connection with a particularly illustrated embodiment thereof it will be appreciated that modifications and variations of my invention may now occur from time to time to those persons normally skilled in the art without departing from the essential scope or spirit of my invention an accordingly it is intended to claim the same broadly as well as specifically as indicated by the appended claims.

1. An electrically operated actuator for the hydraulic brake system of an automotive vehicle operative by direct action on the piston of the master cylinder, comprising in combination,
   a. an electrically actuated drive mechanism including a plunger rectilinearly shiftable when said drive mechanism is actuated, said plunger being adapted for driving engagement with the piston of the master cylinder of an automotive vehicle to thereby pressurize the associated brake system and cause the brakes to be applied,
   b. first control means electrically coupled to said drive mechanism effective to actuate the latter when said first control means is operated, said first control means including mechanical means couplable to the foot pedal brake linkage of an automotive vehicle so that depression of the foot pedal operates said first control means,
   c. second control means mechanically coupled to said drive mechanism and being actuatable and deactuatable by said first control means, said second control means operative when actuated to condition said plunger for rectilinear shifting movement as aforesaid and operative when deactuated to cause said plunger to axially countershift and remove the pressurizing force on the brake system, and
   d. a manually operable drive linkage normally disengaged from but engageable with said drive mechanism and operative when engaged therewith to shift said plunger for pressurizing the associated brake system.

2. An electrically operated actuator for the hydraulic brake system of an automotive vehicle operative by direct action on the piston of the master cylinder, comprising in combination,
   a. any electrically actuated drive mechanism comprising a rectilinearly shiftable plunger, and a unidirectionally rotatable drive screw and a follower nut drivingly engaging said plunger when said drive screw is rotated, and said plunger being adapted for driving engagement with the piston of the master cylinder of an automotive vehicle to thereby pressurize the associated brake system and cause the brakes to be applied,
   b. first control means electrically coupled to said drive mechanism effective to actuate the latter when said first control means is operated, said first control means including mechanical means couplable to the foot pedal brake linkage of an automotive vehicle so that depression of the foot pedal operates said first control means,
   c. second control means mechanically coupled to said drive mechanism and being actuatable and deactuatable by said first control means, said second control means operative when actuated to condition said plunger for rectilinear shifting movement as aforesaid and operative when deactuated to cause said plunger to axially countershift and remove the pressurizing force on the brake system, and
   d. a manually operable drive linkage normally disengaged from but engageable with said follower nut of said drive mechanism and operative when engaged therewith to shift said plunger for pressurizing the associated brake system.

3. An electrically operated actuator for the hydraulic brake system of an automotive vehicle operative by direct action on the piston of the master cylinder, comprising in combination, a. an electrically actuated drive mechanism including a unidirectionally rotatable drive screw with a follower nut threadedly engaged thereon for bidirectional movement longitudinally thereof, b. a bidirectionally rectilinearly shiftable plunger drivingly engage the piston of the master cylinder of an automotive vehicle to thereby pressurize the associated brake system and cause the brakes to be applied, c. guide means to which said follower nut is coupled for bidirectional shifting movement therealong, said guide means being journaled for coaxial rotation with respect to said drive screw, d. selectively actuatable guide means antirotation means coupled to said guide means and operative when actuated to prevent said guide means from rotation with respect to said drive screw, e. retractor means operatively disposed between said plunger and follower nut on the one hand and said guide means on the other hand, effective when said antirotation means is not actuated to rotate said guide means in such rotational sense as to shift said follower nut and plunger to a limiting position in a second direction opposite to the aforesaid first direction and to thereby depressurize the master cylinder, f. control means coupled to said electrically actuated drive screw and to said guide means antirotation means and effective when operated to first actuate said guide means antirotation means and then actuate said drive screw, whereby, said follower nut is thereby axially shifted without rotation along said drive screw and guide means when said drive screw is rotated, and whereby when operation of said control means is discontinued said drive screw ceases rotation and said guide means antirotation means is deactuated to thereby permit operation of said retractor means to axially countershift said follower nut by rotation with said control means including mechanical means couplable to the foot pedal brake linkage of an automotive vehicle so that depression of the foot pedal operates said control means.

4. A brake actuator as described in claim 3 wherein said plunger retractor comprises compression spring mechanism.

5. A brake actuator as described in claim 3 wherein said electrically actuated drive mechanism further includes, a pinion gear fixedly secured to and rotatable with said drive screw, a worm gear drivingly engaged with said pinion gear, and a selectively energizable unidirectional electric motor drivingly coupled to said worm gear, said motor being energizable and deenergizable to respectively rotate and stop said worm gear and thereby rotate and stop said pinion gear and drive screw, the driving engagement between said worm gear and pinion gear preventing counter rotation of said drive screw when said worm gear is stopped.

6. A brake actuator as described in claim 5 wherein said control means comprises first and second electrical switches, said first switch being closable in response to brake actuating movement of said mechanical means couplable to the foot pedal brake linkage to actuate said antirotation device, and said second switch having a plurality of positionally shiftable circuit completing contacts, at least one of said contacts being shiftable in response to brake actuating movement of said mechanical means couplable to the foot pedal brake linkage to close an electric circuit and energize said drive screw rotating electric motor, and another of said contacts being coupled to and shiftable with said follower nut in response to movement of the latter by said drive screw to open an electric circuit and deenergize said drive screw rotating electric motor.

7. A brake actuator as described in claim 3 wherein said control means comprises an electrical switch having a plurality of positionally shiftable circuit completing contacts, at least one of said contacts being shiftable in response to brake-actuating movement of said mechanical means couplable to the foot pedal brake linkage to close an electrical circuit and actuate said drive mechanism, and another of said contacts being shiftable in response to actuation of said drive mechanism to open an electrical circuit and deactuate said drive mechanism.

8. A brake actuator as described in claim 7 wherein said another of said contacts being shiftable in response to actuation of said drive mechanism to open an electrical circuit and deactuate said drive mechanism is coupled to and shiftable with said follower nut.